United States Patent [19]
Koradia et al.

[11] Patent Number: 5,266,548
[45] Date of Patent: Nov. 30, 1993

[54] CATALYST CARRIER

[75] Inventors: Pramod B. Koradia, Stow, Ohio; Carmine M. Doddato, College Station, Tex.; Daniel C. Sherman, Cuyahoga Falls; William H. Gerdes, Hudson, both of Ohio

[73] Assignee: Norton Chemical Process Products Corp., Stow, Ohio

[21] Appl. No.: 937,257

[22] Filed: Aug. 31, 1992

[51] Int. Cl.$^5$ .............................. B01J 32/00
[52] U.S. Cl. ........................ 502/439; 423/213.5
[58] Field of Search ................. 502/439; 423/213.5

[56] References Cited

U.S. PATENT DOCUMENTS

| | | | |
|---|---|---|---|
| 4,102,813 | 7/1978 | Kimura et al. | 502/332 |
| 4,722,920 | 2/1988 | Kimura et al. | 502/439 |
| 4,738,946 | 4/1988 | Yamashita | 502/303 |
| 4,738,947 | 4/1988 | Wan | 502/304 |
| 4,780,447 | 10/1988 | Kim et al. | 502/243 |
| 4,863,712 | 9/1989 | Twigg et al. | 423/651 |
| 4,908,343 | 3/1990 | Bhasin et al. | 502/218 |
| 4,908,344 | 3/1990 | Pereira | 502/313 |
| 4,919,903 | 4/1990 | Gandhi et al. | 423/213.5 |
| 4,952,389 | 8/1990 | Szymanski et al. | 423/625 |
| 4,985,387 | 1/1991 | Prigent et al. | 502/304 |
| 4,987,112 | 1/1991 | Engler et al. | 502/255 |
| 5,039,650 | 8/1991 | Yamada et al. | 502/304 |
| 5,055,442 | 10/1991 | Osaka et al. | 502/439 |

*Primary Examiner*—W. J. Shine
*Attorney, Agent, or Firm*—David Bennett

[57] ABSTRACT

Porous carrier materials comprising at least 90% by weight of at least 95% pure alpha alumina are very effective as supports for catalysts treating engine exhausts and are significantly better able to withstand extreme conditions than conventional supports.

16 Claims, No Drawings

CATALYST CARRIER

FIELD OF THE INVENTION

This invention pertains to catalyst carriers that can be used to support catalysts for a variety of purposes such as the treatment of gaseous waste products comprising carbon monoxide, hydrocarbons and oxides of nitrogen ($NO_x$). from the combustion or incomplete combustion of hydrocarbonaceous fuels.

BACKGROUND TO THE INVENTION

Gaseous waste products from the combustion of fuels pose serious health and environmental problems. Exhaust gases from hydrocarbonaceous fuel burning sources such as stationary engines, industrial furnaces, industrial processes, etc., contribute significantly to air pollution, and the exhaust gases of automobile internal combustion engines have been recognized as a principal source of air pollution. In recent years there has been increasing interest, in view of the large number of automobiles traveling our roads, particularly in urban areas, in controlling the amount of gaseous waste products from automobile exhausts.

Automotive catalytic converters containing exhaust gas catalysts have more or less enabled automobiles to meet current standards established by government agencies to convert a substantial portion of hydrocarbons and carbon monoxide to water and carbon dioxide and the $NO_x$ gases to nitrogen and oxygen and/or water. A wide variety of metals and metal oxides, either alone or in combination, supported on various substrates have been utilized. In recent years, most exhaust gas catalysts have employed a combination of noble metals, particularly platinum, rhodium and/or palladium, as the active materials of the catalyst.

Typically, exhaust gas catalysts comprise a relatively low porosity ceramic support with a transition alumina coating having a high surface area. The underlying ceramic support is generally prepared by sintering a mold of clay or other ceramic material at a high temperature to impart density and strength. This, however, generally results in a support having a very low surface area. Consequently, the ceramic support must be coated with another material having a much higher surface area to contain the catalytic components. The procedure of depositing a high surface area "washcoat", as such coating is generally known, onto a low surface area ceramic support is disclosed in, for example, U.S. Pat. Nos. 2,742,437 and 3,824,196. The ceramic supports may be provided in any shape, but typically they are in the form of pellets or a honeycomb-type shape commonly known as a monolith.

Gamma-alumina is often used as the washcoat in such exhaust gas catalysts. Although a gamma-alumina washcoat imparts a relatively high surface area to an exhaust gas catalyst, it results in number of undesirable effects. Often the washcoat does not adhere well to the underlying ceramic support under severe thermal stress, or has a level of thermal expansion incompatible with the ceramic support. In addition, gamma-alumina or transition-alumina washcoats are thermodynamically unstable alumina phases. Eventually this unstable gamma-alumina phase transforms to a thermodynamically stable alpha-alumina phase; however, in the process of transforming, the alumina loses surface area and traps the catalytic metals and may even change their oxidation state, rendering the less effective or ineffective.

Conventional washcoated exhaust gas catalysts also require a time-consuming, tedious, cost-ineffective, multi-step preparation procedure. This procedure includes preparation of the support, preparation of the washcoat itself, application of the washcoat onto the support and impregnation of all the catalytic and promoter components individually or collectively on to the supported washcoat.

Although wash coated exhaust gas catalysts have acceptable initial light-off temperatures, with age their light-off temperatures often increase, sometimes rapidly. Light-off temperature ("$T_{50}$") is the temperature at which an exhaust gas catalyst begins to convert 50 percent of the waste products of the exhaust gas into carbon dioxide, water, nitrogen and oxygen. Thus, when an automobile is initially started and for the time until the catalyst reaches its light-off temperature, most of the exhaust gases are not catalytically treated but are simply emitted into the atmosphere.

Stable catalytic activity is becoming a critical requirement with automotive exhaust gas catalysts. Conventional exhaust gas catalysts lose approximately half of their activity relatively rapidly, i.e., during the first 12,000 miles of use. Often washcoated exhaust gas catalysts actually physically deteriorate. New government standards for catalytic converters containing exhaust gas catalysts have much stricter longevity requirements, in that such catalytic converters must perform efficiently for much longer periods of time, i.e., 50,000–100,000 miles of use.

SUMMARY OF THE INVENTION

The catalyst carriers of the present invention do not require a washcoat. Rather, a porous, substantially pure alpha-alumina carrier is utilized in which catalytic components are directly impregnated. These catalyst carriers can often utilize less catalyst than do conventional carriers and yet are able to attain overall catalytic activity which is typically better than known catalysts. The carriers of the invention also facilitate reclamation of the catalysts in a simple and cost effective manner, such that essentially all may be recovered and recycled for further use.

Importantly, while the catalyst carriers exhibit initial light-off temperatures comparable to those of conventional washcoated catalysts, these catalysts are more stable over time than washcoated catalysts, and have excellent high-temperature strength and have desirably high thermal shock strength (in spite of the higher thermal expansion properties of alpha-alumina relative to ceramics used as carriers in conventional washcoated catalysts). Hence, improved light-off performance can be obtained when the exhaust gas catalyst is placed closer to the exhaust gas source without sacrificing long term performance of the exhaust gas catalyst.

The carrier of the invention is highly pure alpha-alumina, i.e., alpha-alumina preferably containing less than about 5% by weight impurities. The extremely low concentration of impurities in the carrier contributes to stable catalytic performance at the high temperatures encountered in, for example, automotive catalytic converters operating under routine, and especially under transient, conditions.

DETAILED DESCRIPTION OF THE INVENTION

The catalyst carrier may be used for the reduction of nitrogen oxide gases and oxidation of carbon monoxide and hydrocarbons contained in, for example, the exhaust gases from internal combustion engines or stationary industrial exhaust sources. A typical exhaust gas catalyst comprises the porous, substantially pure alpha-alumina carrier, and a catalytically effective amount of a noble metal impregnated in the carrier.

The carrier may be of various shapes; however, monoliths are preferred, particularly for automotive catalytic converter applications. Monolith carriers for automotive catalytic converters may be cylindrical, spherical, square, oval, racetrack or ellipsoidal shaped, depending on the desired end use. For exhaust gas catalysts used in treating stationary industrial exhaust sources, pill-shaped carriers may be used and packed into an appropriate catalyst housing. A prime consideration in selecting the shape of a carrier is its ability to be used in the catalyst housing for which it is intended.

With a carrier having obligatory gas channels, e.g., a monolithic structure, wherein the exhaust gas is directed to pass through the obligatory gas channels rather than around the carrier, it is generally preferred to employ a plurality of obligatory gas channels to both minimize pressure drop and maximize available surface area for diffusion into and from the pores of the carrier. Hence, in most instances at least about 25, preferably 40 percent, more preferably 60–70 percent of the open frontal area; (that is the surface presented to the gas flow when the carrier is in use), of such a carrier comprises obligatory gas channels.

Often, the open cell density of the catalyst carrier is about 100 to 400 cells per square inch ("cpi"), preferably about 200 to 400 cpi. The higher the open frontal area of the carrier, the lower the pressure drop. However, high geometric surface area in the carrier is desirable to maximize contact of the gaseous waste products with the catalyst. Hence, a higher open cell density in combination with relatively thin walls is desirable. It is often desired to maintain the minimum cross-sectional dimension of each of the obligatory gas channels above about 1.0 millimeters. Usually, wall thicknesses between such obligatory gas channels are below about 5 millimeters and advantageous results can be obtained using wall thickness of less than about 3 millimeters, such as 0.2, 0.4, 1 or 2 millimeters.

The cross-sectional shape of the obligatory gas channels may be any convenient shape. Usually, square circular, triangular, or hexagonal patterns are used. Uniform spacing of the obligatory gas channels is generally preferred such that the flow, heat generation and dimensional stability are enhanced. The paths of the obligatory gas channels may be straight, curved, or tortuous as in a sponge structure. Straight obligatory gas channels are preferred for use in exhaust gas catalysts for treating exhaust gas that does not contain particulate matter. For treating exhaust gas containing particulate matter, such as from diesel engines, curved or tortuous obligatory gas channels are preferred in order to trap the particulate matter without significantly reducing gas phase conversions or increasing pressure drop.

The size of the carrier is usually dependent on the size of the housing in which it is intended to function. Undue amounts of exhaust gas should be prevented from circumventing the obligatory gas channels. Thus, for an automobile exhaust gas catalyst the carrier is, for example, cylindrical with a diameter approximating the inside diameter of a typical automobile catalytic converter housing, e.g., about 10 to 20 centimeters. The length of such a carrier can vary widely, and for automobile exhaust gas catalysts is preferably less than the length of a typical commercial automobile catalytic converter housing, e.g., about 10 to 30 centimeters.

Frequently, the average side and end-on crush strength of the carrier of the invention is at least about 10, preferably 20, pounds. More preferably, the average side and end-on crush strength of the carrier is in the range of 50 to 100 pounds or more.

The attrition loss of pill-shaped carrier is preferably less than about 25 percent per hour, and more preferably, less than about 15 percent per hour.

The porous, substantially pure alpha-alumina carrier preferably has the following characteristics. The porosity, (or total pore volume), of the carrier is preferably about 0.2 cubic centimeter per gram to about 0.6, preferably from about 0.3 to about 0.5 cubic centimeter per gram of carrier; the surface area is about 0.2 square meter per gram to about 10 square meters per gram of alpha-alumina carrier and, preferably, about 0.3 square meter per gram to about 4 square meters per gram; and the average pore size of the pores in the carrier is about 0.1 micron to about 100 microns, a major proportion of the pores having a size in the range of about 0.1 micron to about 10 microns, the preferred average pore size being about 0.2 micron to about 5 microns.

It is sometimes advantageous to have a bimodal pore distribution, that is some fine pores and some more coarse pores, each set in its own narrowly defined size range.

The porous, alpha-alumina carrier has a very high purity, i.e., at least about 95 weight percent alpha-alumina, preferably at least about 98 weight percent alpha-alumina. Impurities, particularly silicates and aluminosilicates of alkali and alkaline earth metal oxides, are extremely detrimental to the exhaust gas catalyst. Such impurities preferably comprise no more than about 4% such as less than 2%, and most preferably no more than about 1 percent, of the carrier.

The carrier often advantageously may contain oxygen promoter compounds in an amount up to about 10%, such as from about 1% to about 5% by weight. Such compounds are well-known in the art. They have the capability of releasably storing oxygen during oxidation reactions when operating in oxygen rich situations and then giving it back in oxygen-poor reaction conditions. Thus the effect is to smooth out any compositional variations that may occur in the exhaust gas composition during use. Typical oxygen promoter compounds are the oxides of metals in the Groups IIIA to VIIA of the periodic table and rare earth metals, such as titanium, chromium, vanadium, manganese, zirconium, niobium, molybdenum, lanthanum, and cerium. The preferred oxygen promoters are the oxides of lanthanum and cerium.

The carriers of the invention are made by mixing the alpha alumina in the form of a powder having a particle size range of from about 0.2 to about 20 and preferably from about 0.5 to about 10 microns, with the oxygen promoter, (where present), a burn-out material and a binding agent to hold the formulation together until calcination is complete. The binding agent is particularly necessary where the carrier is formed by an extrusion process.

The burnout material is intended to provide the pores in the finished catalyst, and is completely removed during calcination. It therefore tends to be an organic material that can be completely burned out at temperatures well below the firing temperature at which the carrier is formed. Suitable materials include coke, carbon powders, graphite, powdered plastics such as polyolefins, poystyrene, polycarbonate, and naturally occurring materials such as rosin, sawdust, ground nut shells such as walnuts, cashews, pecans and filberts. The burn out agents are provided in an amount and in particle sizes that correspond to the desired pore sizes in the finished carrier.

The function of the binding agent is to hold the materials of the composition prior to calcination and particularly during extrusion. It also adds lubricity, a great assistance during extrusion. Suitable binding agents include alumina gels, such as boehmite, particularly when peptized by addition of acid, which will convert to alpha alumina upon firing. Other binding agents are organic compounds such as celluloses and methyl-, ethyl-, amd carboxyethyl-celluloses, organic stearates, waxes, polyolefin oxides and the like. Such organic binders are often useful in that they can also serve as pore forming burn-out materials.

The preferred monolithic form of the carrier is produced, for example, by an extrusion molding method, or a method comprising folding a corrugated paper sheet saturated with wet carrier starting material into a bundle. The extruded or wet formed carrier is dried carefully to maintain the monolith shape and structure and minimize gradients of water vapor between the monolith and the surrounding atmosphere. The dried monolith is calcined at a temperature of up to about 1200° to 1600° C., and preferably from about 1300° to 1500° C., to remove combustible organics and bind the alumina. The time for calcination can be from about 0.5 to 10 hours though a five hour maximum calcination is more ususal.

Without wishing to be bound by theory, it is believed that the structure of the highly pure alpha-alumina carrier, i.e., the specific combination of pore size, porosity and surface area, facilitates reclamation of substantially all of the catalytic metal contained in the catalyst. Thus, as a result of subjecting the catalyst to a reclamation process, upwards of 95% of the catalytic metal is recovered.

The following examples are offered solely for the purpose of illustrating specific embodiments of the invention and, in particular, its utilization in the conversion of gaseous waste products from automotive internal combustion engines. Such examples are not intended to limit the scope of the invention.

As used herein the following parameters are measured as follows. "Surface Area" is measured by the conventional B.E.T. method described by S. Brunauer, et al., in *J. Am. Chem. Soc.*, 60:309-16 (1938). The "pore volume" or "porosity" is determined by either conventional mercury porosity or water absorption techniques and, unless otherwise specified, the water absorption technique is used. "Pore diameters and distributions" are obtained by the method of measurement described in C. Orr, Jr., "Application of Mercury Penetration to Materials Analysis", *Powder Technology*, 3:117-123 (1970).

EXAMPLE I

A catalyst carrier according to the invention was prepared. The carrier was made with 99.6% pure alpha-alumina and was formed in to a monolith by the process described in Example 2. The surface area of the carrier was 0.93 $m^2/g$, the pore volume of the carrier was 0.35 cc/g and the median pore diameter was 1.2 microns.

A catalyst composition was deposited in the carrier and the carrier-supported catalyst was dried under controlled humidity drying. That is, at 30° to 32° C. under a high flow of humid air (i.e., containing water). At the start of drying, the humidity of the air was approximately 96%. As drying proceeded, the relative humidity of the air was slowly lowered to 35% over eight hours. The humidity was then maintained at about 35% for an additional 6 hours. After controlled humidity drying, the carrier/catalyst combination was calcined at 500° C. for one hour in air.

The catalyst supported on the carrier according to the invention was wrapped with a high temperature stable alumina fibermat sheet and then placed in a suitable container to provide an automotive exhaust catalytic muffler. This was then installed in an V-8, 5.7 liter Chevrolet engine.

After catalyst break-in and some test evaluations, the initial performance of the system was measured at 500° C., about 80,000 GHSV, (gas-hourly space velocity) and ±0.5 A/F, (air to fuel ratio), frequency sweep from 14.2 to 15.4 A/F.

The exhaust gas catalyst was then placed in the exhaust of a V-8, 7.5 liter Ford engine to test the high temperature stability. The temperature of the catalyst was set at 1100° C. for 40 minutes by running the engine on the rich side and injecting additional air. Then a spark plug was removed from the engine, allowing extra unburned fuel and air to reach the catalyst to simulate misfire of a cylinder, causing the engine temperature to reach about 1200° C. The temperature of the exhaust gas catalyst was maintained at about 1100° C. for about one minute and the catalyst carrier was examined. No cracks, structural damage or meltdown areas were observed. The conversion levels of the catalyst/carrier on the same V-8 chevrolet engine were again measured.

For the purposes of comparison a commercial catalytic converter from a Honda Accord was tested under the same conditions on the same engine. The carrier has a conventional formulation with a gamma alumina wash-coated surface on a ceramic base. The total volume of the catalyst/carrier structure was 81 cubic inches and the open cell density was 300 cpi. The catalyst formulation however contained significantly more noble metal than the catalytic composition deposited in the carrier of the invention.

While the initial conversion performance, (hydrocarbon, carbon monoxide and NOx), of the commercial Honda catalyst was a little better than that of the catalyst on the carrier of the invention, after the high temperature test the performance of the catalyst on the carrier of the invention had deteriorated slightly in hydrocarbon conversion it had actually improved in CO and NOx conversion. By contrast the Honda product had suffered significant drops in conversion levels for all components and in addition showed areas where the monolith structure was missing due to melt down.

Thus the alpha alumina carriers of the present invention are effective as supports for catalytic formulations for use in automotive applications and show a distinctly better high temperature stability than the conventional carriers of the art.

EXAMPLE 2

This Example details the production of a typical carrier according to the invention.

A formulation comprising 100 parts by weight of a 99.6% pure alpha alumina with an average particle sizes of about 3.5 microns, 5 parts by weight of walnut shell flour, 2 parts by weight of "Superloid", a ammonium alginate binder available from the Kelco division of Merck & Co., 0.1 part by weight of a surfactant, and 4.5 parts by weight of vaseline as a lubricant was thoroughly mixed to form an extrudable paste. (All parts by weight are based on 100 parts of alumina). The mixing technique was to dry mix all the components except the vaseline and then add water and mix for 3 minutes before adding the vaseline and mixing for a further 2-5 minutes. Enough water is added to give a mixture that is extrudable through a ¼ inch die with an extrusion pressure of at least 1000 kPa.

The extrusion chamber of a conventional extruder was filled with the paste, the extruder was sealed and air was exhausted from the chamber by pulling a vacuum. Extrusion was begun at a rate of about 12 inches per minute at a pressure of about 1000 psi through a die producing a monolith with a plurality of obligatory channels. The monolith was extruded onto a support and was dried under controlled humidity, beginning at 96% R.H. reducing to 40% R.H. after 8 hours. The relative humidity was kept at 40% for 6 hours. Water was eliminated at a rate of about 0.1 g/hour for every gram of the carrier (final weight).

Microwave drying can be used with a schedule of 5 minutes on high, followed by a one minute cool-down period, a further 10 minutes on high followed by a one minute cool down, and a final 15 minutes on high.

The dried monoliths were then set on a support bed in a sagger. The ramp rate was 28° C./hour, up to 1343° C. and the temperature was held at this level for 5 hours.

The finished product had an apparent porosity of 56.2%, a water absorption of 32.5%, an apparent specific gravity of 3.95, a particle density of 1.73 g/cc, a surface area of 0.93 m$^2$/g, a porosity of 0.35 cc/g and a median pore diameter of 1.2 micron.

What is claimed is:

1. A catalyst carrier consisting essentially of at least 90% by weight of an alpha-alumina that is at least 95% pure and up to about 10% by weight of an oxygen promoter, the carrier having a porosity of from about 0.2 cubic centimeter per gram to about 0.6 cubic centimeter per gram of carrier, a surface area of from about 0.2 square meter per gram to about 10 square meters per gram and an average pore size of from about 0.1 micron to about 100 microns.

2. A catalyst carrier according to claim 1 in which the amount of silicates and aluminosilicates present is less than two percent by weight.

3. A catalyst carrier according to claim 1 in which the oxygen promoter is present in an amount of from about 1 to about 5% by weight.

4. A catalyst carrier according to claim 1 in which the oxygen promotor is an oxide of a metal selected from the group consisting of molybdenum, vanadium, manganese, chromium, titanium, niobium, zirconium and the rear earth metals.

5. A catalyst carrier according to claim 1 in the form of a monolith having obligatory gas channels.

6. A catalyst carrier according to claim 5 in which the open cell density of the structure is from about 100 to about 400 cells per square inch.

7. A catalyst carrier according to claim 5 in which the monolith comprises an open frontal area with obligatory gas channels and the channels comprise at least about 25% of the open frontal area.

8. A catalyst carrier according to claim 5 in which the minimum cross-sectional diameter of the obligatory gas channels is above about one millimeter.

9. A catalyst carrier according to claim 5 in which the wall thickness between adjacent obligatory gas channels is less than 5 millimeters.

10. A catalyst carrier according to claim 5 in which the monolith has average side and end-on crush strengths of at least 20 pounds.

11. A catalyst carrier according to claim 1 in the form of pill-shaped particles.

12. A catalyst carrier according to claim 11 having an attrition resistance of less than 25% per hour.

13. A catalyst carrier in the form of a monolith having obligatory gas channels and consisting essentially of at least 95% by weight of alpha-alumina, from 1 to 5% by weight of an oxygen promoter which is an oxide selected from oxides of rare earth metals and metals in groups IVA, VA, VIA and VIIA of the Periodic Table, and less than two percent of silicate and/or aluminosilicate impurities, said monolith having a porosity of from about 0.3 cubic centimeter per gram to about 0.5 cubic centimeter per gram of carrier, a surface area of from about 0.3 square meter per gram to about 4 square meters per gram and an average pore size of from about 0.2 micron to about 5 microns.

14. A catalyst carrier according to claim 13 having an open frontal area in which the obligatory gas channels provide at least about 40% of the open frontal area.

15. A catalyst carrier according to claim 13 in which the open cell density is from about 200 to about 400 cells per square inch and the wall thickness between adjacent obligatory gas channels is below about 3 mm.

16. A catalyst carrier according to claim 13 in which the alumina component is at least 98% alpha alumina.

* * * * *